United States Patent [19]
Fiore

[11] Patent Number: 6,099,243
[45] Date of Patent: Aug. 8, 2000

[54] CENTRIFUGAL PUMP WITH SEAL COOLING AND DEBRIS FLUSHING ARRANGEMENT

[75] Inventor: Raymond F. Fiore, Peoria, Ill.

[73] Assignee: Caterpillar Inc., Peoria, Ill.

[21] Appl. No.: 09/240,297

[22] Filed: Jan. 29, 1999

[51] Int. Cl.[7] .................................................. F04D 29/06
[52] U.S. Cl. ........................ 415/111; 415/58.2; 415/58.4; 415/168.2; 415/176; 415/204; 415/206; 415/231
[58] Field of Search ................................. 415/58.2, 58.4, 415/111, 112, 168.2, 176, 203, 204, 206, 230, 231, 121.2; 277/358, 361, 370, 391

[56] References Cited

U.S. PATENT DOCUMENTS

| | | | |
|---|---|---|---|
| 2,101,960 | 12/1937 | Sjostrom | 415/110 |
| 2,671,406 | 3/1954 | Waller | 415/58.2 |
| 2,859,698 | 11/1958 | Buehler | 415/204 |
| 5,713,719 | 2/1998 | Fiore et al. | 415/58.2 |
| 5,827,041 | 10/1998 | Charhut | 415/112 |

*Primary Examiner*—Edward K. Look
*Assistant Examiner*—Ninh Nguyen
*Attorney, Agent, or Firm*—Gordon H. Telfer

[57] ABSTRACT

A centrifugal pump of the type in which fluid enters radially includes a debris blocking shield over a space around a shaft seal with a channel to supply energized fluid to near the center of the pump impeller. Apertures in the impeller then pass the fluid longitudinally through the impeller and the seal space covered by the shield, with a shield gap for the return of the fluid from the seal space into the main stream.

13 Claims, 2 Drawing Sheets

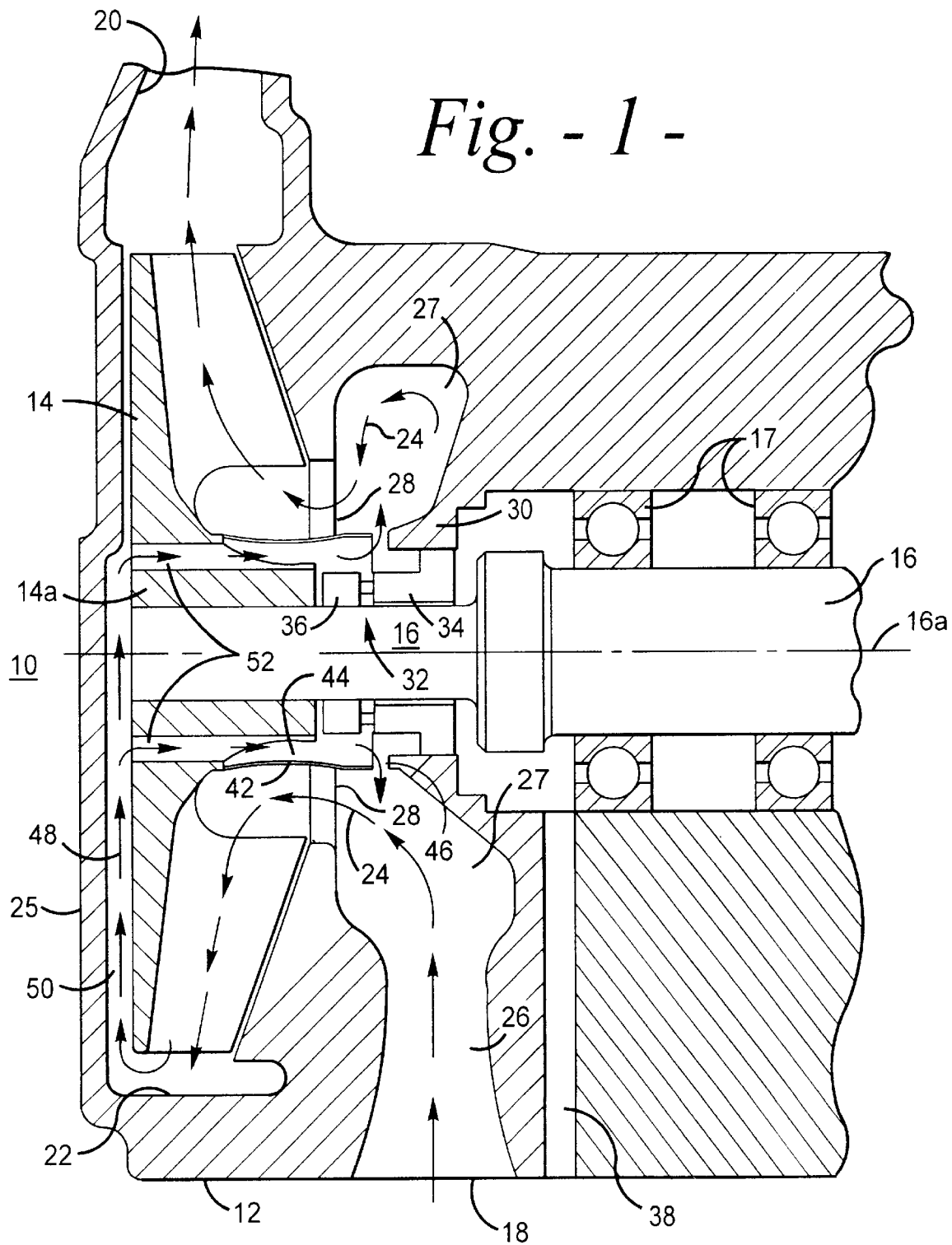
Fig. - 1 -

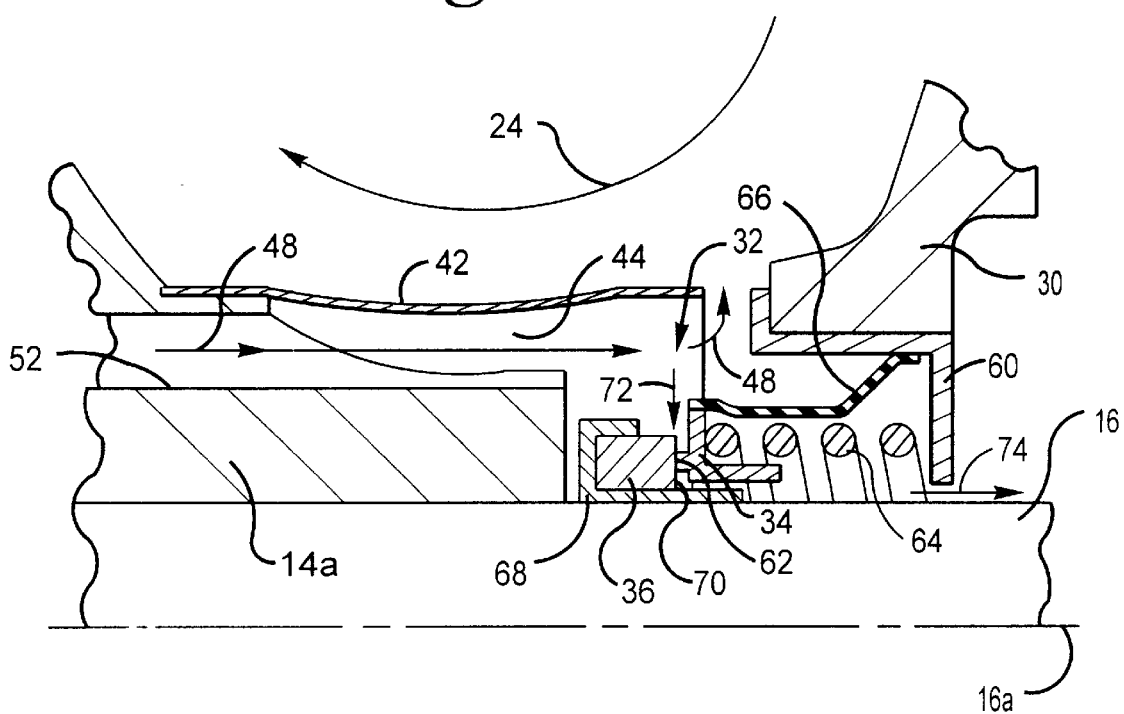

CENTRIFUGAL PUMP WITH SEAL COOLING AND DEBRIS FLUSHING ARRANGEMENT

TECHNICAL FIELD

This invention relates to centrifugal pumps, such as pumps used as coolant pumps for internal combustion engines, and to arrangements for cooling and flushing debris from mechanical shaft seals in such pumps.

BACKGROUND ART

Centrifugal pumps have a shaft mounted impeller imparting energy to a fluid entering from a low pressure inlet port and exiting a high pressure outlet port. The shaft is sealed against unintended fluid flow to the atmosphere by a mechanical seal mounted in the pump housing. The fluid being pumped is primarily a coolant for engine cooling. In addition, the same coolant is used to cool and lubricate the mechanical seal. Seal deterioration can result due to debris in the fluid and also from elevated temperatures encountered in operation due to inadequate seal lubrication by the coolant.

In U.S. Pat. No. 5,713,719, Feb. 3, 1998, by the present inventor and another, there is disclosed a centrifugal pump of a type in which the inlet is centrally located on the front face of the pump housing (i.e., an axial entry pump) modified to include a self flushing feature for improved seal life. The self flushing feature of the patent provides a secondary fluid flow path wherein some of the energized pump fluid is drawn into a region containing the seal and out through apertures in the impeller. The positive flow of fluid through the seal region enhances seal cooling and debris removal.

SUMMARY OF THE INVENTION

The particular self flushing arrangement of the prior patent mentioned above is not directly applicable to some other centrifugal pumps. Pumps are sometimes, generally for more compact design, provided with an inlet port that is radially disposed from the shaft (i.e., a radial entry pump). In such a pump, the fluid enters the pump housing and passes into a region near the seal where it is redirected toward the impeller. The impeller imparts centrifugal energy to the fluid, thus creating a pressure differential in the fluid system causing fluid flow. Absent the present invention, the resulting low pressure generated at the impeller inlet can be adverse for the seal, since it relies on a pressure differential between coolant on the impeller side of the seal and the atmosphere to draw fluid to form a film between the seal faces for effective seal face lubrication and sealing. The present invention includes ways to enhance fluid flow at the seal in a pump with the shaft seal mounted on the low pressure, or inlet, side of the impeller, such as a centrifugal pump of the radial entry type.

Improved seal cooling and debris flushing is provided by the present invention in such a pump by an arrangement that includes a shield, mounted on the impeller, that encloses a seal cavity, which is a space proximate the seal, except for a small gap at the end of the shield away from the impeller. Among its functions, the shield is a barrier against debris carried by fluid from the inlet port impinging on the seal. Moreover, the shield serves to define part of a secondary fluid cooling and flushing flow path through the seal cavity that draws a minor portion of the fluid in a primary flow path between the inlet and outlet ports. The secondary flow path takes energized fluid from the primary path, such as from a volute region radially out from the impeller, and passes it through a channel between the impeller and a closed face of the housing. There is access from the channel through apertures in the impeller to the seal space under the shield. The secondary flow cools and flushes any debris from the seal and passes out the above-mentioned gap back into the primary flow path. The invention serves to provide increased pressure at the seal faces to enhance the formation of the lubricating film between the faces and, therefore, helps to protect the seal and to provide cooling and flushing that can extend seal life.

These and other aspects of the inventive apparatus will become more apparent from the following description.

BRIEF DESCRIPTION OF THE DRAWING

FIG. 1 is a cross section of an example of a pump in accordance with the invention; and, FIG. 2 is an enlarged cross-section of part of FIG. 1.

DESCRIPTION INCLUDING PREFERRED EMBODIMENTS

Referring to the drawing, a cross-sectional view of a centrifugal pump 10 of the radial entry type is shown. Pump 10 has a housing 12 containing an impeller 14 mounted by its hub 14a on a shaft 16 having an axis 16a. Typically, the shaft 16 is supported by bearings, such as two axially spaced bearings 17. The housing 12 has a fluid inlet port 18 that is radially spaced from the shaft 16. The housing 12 also has an outlet port 20 and a volute passageway 22. Inlet port 18, volute passageway 22 and outlet port 20 comprise parts of a primary fluid flow path 24. Typically, inlet port 18 is connected with a radiator of an engine cooling system and outlet port 20 is connected with an engine.

A closed face 25 of the housing 12 prevents fluid flow in or out of that side of the housing. Fluid entering inlet port 18 proceeds in through a radial passage 26 of the housing 12 to a low pressure region 27 proximate the inner part of the impeller 14. There the fluid passes longitudinally through a circumferential transition 28 in the housing 12 to the impeller 14. The fluid energized by the impeller 14 passes generally outward to the volute passage 22 and then to the outlet port 20. The volute passage 22 substantially encircles the impeller 14.

The housing 12 includes a support member 30 with a mechanical seal 32 that bears against the shaft 16 to avoid undesired fluid flowing axially away from the intended flow path and ultimately leaking externally from the pump. A small amount of the secondary path fluid passes between the seal faces for cooling and lubrication creating a tertiary flow path. The seal 32 can be variously constructed in accordance with known practices. For example, it can be a mechanical face type seal with a stationary part 34 secured by a press fit within the housing support 30 running against a rotating part 36 on the shaft 16. In FIG. 1, a representative seal 32 is shown in simplified form. Seal 32 includes a fixed seal component 34 secured to the housing and a rotating component 36 mounted on the shaft 16. A further description of an example seal is given below in connection with FIG. 2.

The above described elements of a radial entry type of centrifugal pump 10 may be formed in accordance with known practice for such pumps. Typically, the pump would additionally have a drive element (not shown) receiving mechanical power for rotation of the shaft. Also, a part of the housing 12 on the inward side of the seal 32 can be provided with a drain channel 38 for the incidental fluid that passes through the seal 32 to the atmosphere.

In accordance with the invention, the basic structure of pump 10 includes modifications so the cooling of seal 32, and removal of any debris from the seal, does not depend just on the action of the fluid in the primary fluid flow path 24.

The illustrated seal cooling and debris flushing arrangement includes a shield 42 that encloses a seal space or seal cavity 44 proximate the seal 32 except for a gap 46 whose purpose will be described below. As one function, the shield 42 substantially blocks any debris (e.g., metal particles) entering through the inlet port 18 from directly hitting the seal 32 and damaging it or interfering with its operation. Also, the shield 42, with gap 46, defines part of a secondary fluid flow path 48 for cooling seal 32 and flushing debris from the seal vicinity.

In this example, shield 42 is a substantially cylindrical member that is secured to impeller 14, near hub 14a of the impeller, and extends longitudinally over the seal space 44. The space 44 under the shield 42 is small in radial dimension compared to the radial extent of the impeller 14. The shield 42 of this example has a contoured surface, with a slight concavity toward the primary flow path 24, to make flow through the transition 28 more smooth. The gap 46 occurs between the end of the shield 42 away from the impeller 14 and the housing portion 30.

The secondary fluid flow path 48 also includes a fluid channel 50 in the closed face 25 of the housing allowing a desired amount of fluid to be carried from volute passage 22 radially inward. In contrast, former radial entry pumps had only minimal clearance between housing face 25 and impeller 14 over the entire housing face.

The impeller 14, or impeller hub 14a, is provided with a fluid passageway or access from channel 50 to the seal space 44. In this example, the access is provided by two apertures 52 which are oppositely disposed equidistant from axis 16a of shaft 16. Apertures 52 provide a direct longitudinal path for secondary fluid flow from channel 50 into the seal space 44 under shield 42. Any number of apertures 52 may be included in the structure including one or more.

The secondary flow through space 44 is of fluid whose pressure has been raised by the action of impeller 14 and that fluid exits space 44 through gap 46 into the primary fluid on the low pressure side of the impeller.

It will be recognized that in the figure, the space 44 under shield 42 is an annular space around the seal 32 and part of the impeller hub 14a which are also annular or circular. Apertures 52 are discrete apertures feeding into space 44. Also, inlet port 18 and radial passage 26 have a cross-section that is confined to a limited portion of the circumference of the pump but communicate to an annular low pressure region 27 adjacent the longitudinal transition 28 into the impeller 14. The volute 22 extends from between impeller blades and includes a region around the circumference of the impeller 14 while the outlet port 20 is limited to a portion of the circumference. The channel 50 spans q just a small portion of the area of face 25 sufficient to communicate with apertures 52. Particular dimensions of the various elements can be selected to provide the desired flow characteristics in the primary and secondary flow paths. Typically, the minor amount of fluid drawn off into the secondary path 48 is not more than about 2% of the total.

Referring to FIG. 2, an enlarged portion of the seal 32, shield 42 and seal space 44 are shown to further describe the structure and its operation. The structure is substantially symmetrical about the shaft axis 16a.

An example of seal 32 is shown in which the fixed component 34 has a seal shell 60 secured to the housing seal support 30. A seal face 62 is supported by spring 64 on shell 60. Seal face 62 is made of any of various seal materials such as carbon based, ceramic based, or metal based materials. A rubber cover or seal 66 is secured to the shell 60 and the part having seal face 62 to prevent leakage between members 60 and 62.

The rotary part 36 of the seal 32 includes a sleeve 68 pressed onto the shaft 16 and supporting a rotating seal face member 70, which may be of a seal material such as was discussed above.

In operation, the seal interface between the fixed face 62 and the rotating face 70 is provided with pressurized fluid (arrow 72) from the secondary fluid flow 48 that cools and lubricates the seal faces. Fluid passing through the seal faces 62 and 70 exits to atmosphere along the shaft 16 (arrow 74) to the leak path channel 34 shown in FIG. 1. The path 72-74-34 is therefore a tertiary fluid flow path of some fluid from the secondary flow 48 made possible by the closed face channel 50, aperture 52 and shield 42.

Industrial Applicability

The invention improves the life of seals in centrifugal pumps of the radial entry type. This is of benefit for greater reliability and reduced maintenance requirements in applications such as engine coolant systems.

What is achieved is to protect the coolant seal from debris that may be contained in the fluid entering the inlet to the pump and to provide positive pressure at the seal to improve lubrication and cooling of the sliding faces of the seal and flush away any debris.

Prior designs of radial entry centrifugal pumps can be readily modified to incorporate the invention including a channel 50 for drawing some high pressure fluid from the volute 22 and feeding it radially behind the impeller 14 to one or more apertures 52 and then longitudinally through the apertures 52 and the space 44 under the shield 42 and radially out through gap 46.

It will be apparent that numerous variations can be made from the specific examples described above in keeping with the basic concepts of the invention.

What is claimed is:

1. A centrifugal pump of the radial entry type comprising:
   a housing with an inlet port and an outlet port and containing an impeller on a shaft for rotation;
   a seal located to be in contact with the shaft to limit fluid leakage;
   a primary fluid flow path between the inlet port and the outlet port and a secondary fluid flow path passing through a space proximate the seal;
   the secondary fluid flow path being defined by a substantially radial channel in a closed face of the housing adjacent the impeller, one or more apertures through a central portion of the impeller, and a shield extending from the impeller substantially over the seal with a gap, wherein a portion of fluid energized by the impeller is forced under pressure from the primary flow path into the channel radially inward to the impeller apertures, longitudinally through the apertures into a space under the shield and then out the gap (46) back to the primary fluid flow path.

2. The pump of claim 1 wherein:
   the shield is located to protect the seal against debris contained in fluid entering thorough the inlet port.

3. The pump of claim 2 wherein:
   the apertures through the impeller comprise a pair of radially spaced apertures opposite each other in relation to the shaft axis and the apertures are in direct longitudinal alignment with the space under the shield.

4. A centrifugal pump, with seal cooling and debris flushing features, comprising:

a housing having a fluid inlet port and a fluid outlet port;

an impeller supported on a shaft, with an axis of rotation, in the housing to pump fluid from the inlet port to the outlet port through a primary flow path comprising a volute passageway between the inlet and outlet ports;

the housing having a closed face transverse to the axis of rotation and the inlet port being radially located in relation to the shaft, away from the closed face, the primary flow path including a first portion substantially radially inward from the inlet port and a second portion that carries fluid substantially longitudinally from the first portion to the impeller on a side of the impeller opposite the closed face of the housing;

a seal supported in the housing in sealing relation to the shaft;

a seal cooling and debris flushing arrangement comprising a shield substantially enclosing a space proximate the seal except for a preselected gap, the shield being arranged for substantial protection of the seal against impingement of debris carried in the fluid in the primary flow path;

the seal cooling and debris flushing arrangement also providing a secondary cooling and flushing fluid flow path wherein a minor portion of fluid is taken form the primary flow path and passed through a secondary fluid channel between the impeller and the closed face of the housing with access through the impeller in the seal space and out through the gap in the shield.

5. The centrifugal pump of claim 4 wherein:

the minor portion of fluid is taken from the volute of the primary flow path after being acted on by the impeller.

6. The centrifugal pump of claim 4 wherein:

the minor portion of fluid consists of less than about 2% of the fluid in the primarily flow path.

7. The centrifugal pump of claim 4 wherein:

the outlet port is arranged to supply fluid to an engine, the inlet port is arranged to receive fluid from a radiator.

8. The centrifugal pump of claim 4 wherein:

the access of secondary fluid through the impeller is provided by one or more apertures through the impeller adjacent the seal space.

9. The centrifugal pump of claim 8 wherein:

the apertures through the impeller comprise a pair of radially spaced apart apertures.

10. The centrifugal pump of claim 8 wherein:

the shield comprises a piece of material extending longitudinally from the impeller over a portion of the seal and the one or more apertures through the impeller are longitudinally in a substantially direct line from the secondary fluid channel to the space enclosed by the shield.

11. The centrifugal pump of claim 8 wherein:

the gap in the shield over the seal space is located between the shield and a part of the housing at an end of the shield opposite the impeller.

12. The pump of claim 8 wherein:

a portion of pressurized secondary fluid is drawn through the seal to cool and lubricate fixed and rotating seal faces.

13. The pump of claim 12 wherein:

secondary fluid drawn throughout the seal exits the seal space along the shaft to a leak path channel.

* * * * *